FIG.2.
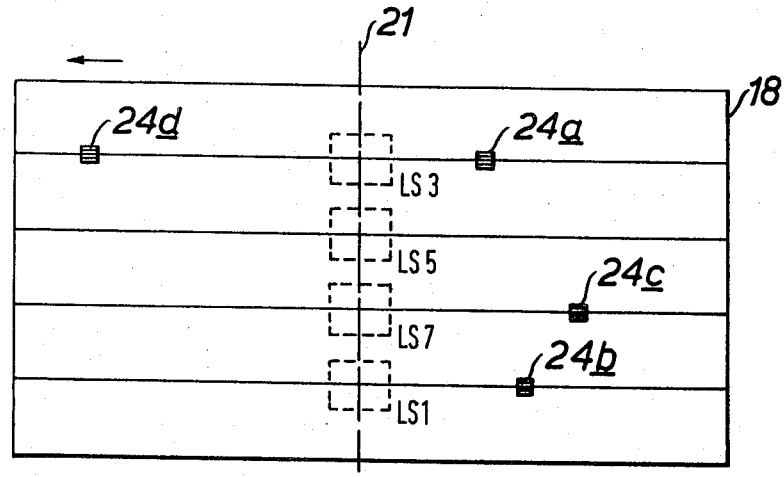
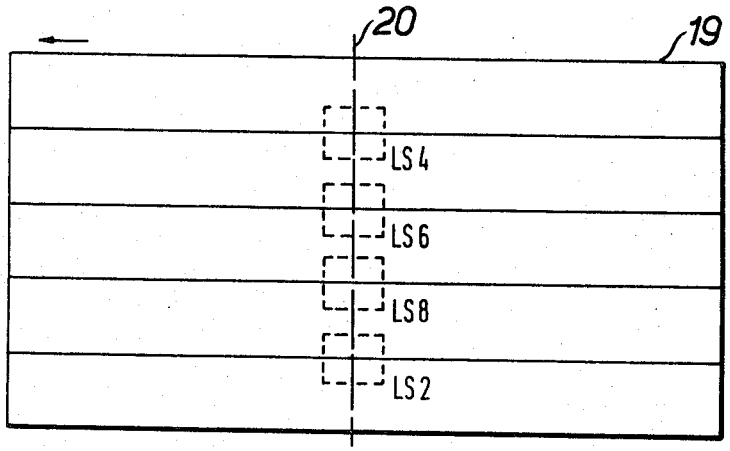

under the heading "United States Patent Office"

3,564,957
Patented Feb. 23, 1971

3,564,957
CONTROL SYSTEMS FOR MACHINE TOOLS
Zsigmond Markgraf, Warwick, England, assignor to Wickman Machine Tool Sales Limited, Coventry, England
Filed June 14, 1968, Ser. No. 737,037
Claims priority, application Great Britain, June 26, 1967, 29,336/67
Int. Cl. B23b 7/14
U.S. Cl. 82—2    6 Claims

ABSTRACT OF THE DISCLOSURE

A plug board control system for a machine tool, including a plug board having a plurality of columns with each column having a plurality of plug sockets. A group of plug sockets of one column together with the corresponding plug sockets in the other columns when containing plugs cause operation of part of the machine tool in a particular way by way of control means respectively and switch means is provided to scan the group of plug sockets of one column in turn. The switch means serves to complete an electric supply circuit to the control means when the plug socket associated therewith contains a plug, said switch means being arranged to stop scanning the plug sockets when it reaches a plug socket containing a plug to continue scanning upon receipt of a signal from the machine tool that an operation has been completed.

Figure 1:
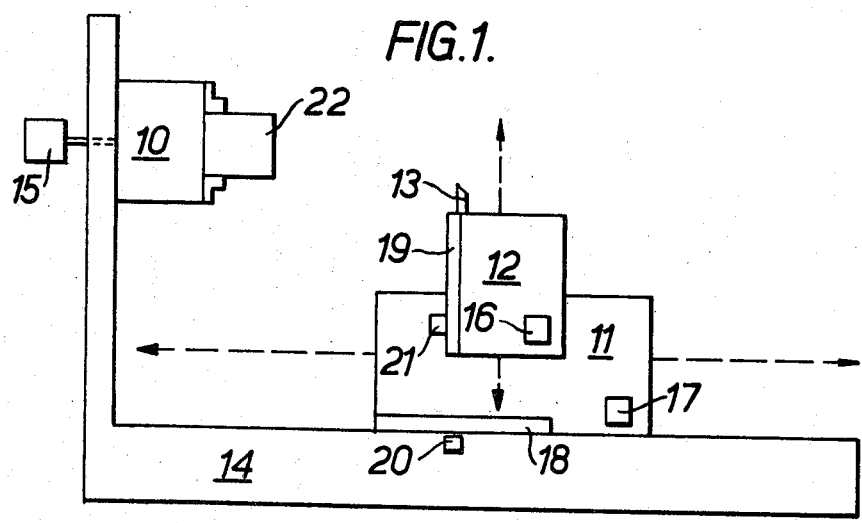

This invention relates to plug board control systems for machine tools.

Known systems of this type employ a plug board having a plurality of columns of plug sockets and in each column there is a plurality of plug sockets. The columns of plug sockets are divided into groups and each group is associated with a particular part of the machine tool. A plug inserted in a plug socket of one group of one column will permit the associated part to operate in a particular way such for instance a particular speed in the case of a chuck of a lathe, and a plug inserted in a plug socket of the same group in another column, will permit the part to operate in another way such for instance at a different speed. In setting up such a system in each column there will be one plug per group of plug sockets but depending on the nature of the job to be performed by the machine it is not essential for every group of plug sockets to have a plug. In use, each column is scanned and the various parts of the machine operate in a way determined by the positions of the various plugs. Whenever a change in one of the operating conditions of one of the parts of the machine is required the next column must be scanned and this process continues until the machining operation is finished. In order to machine a simple workpiece only a few columns may be required but if a complex workpiece is to be machined then a large number of columns will be required. Since the plug board is an expensive item in itself and also requires a large mounting panel only a limited number of columns can be provided so that it may not be possible to programme the machine to produce a complex workpiece. The object of the present invention is to provide a plug board control system in which for the same limited number of columns a greater number of changes of the operating condition of the machine can be provided.

According to the invention a plug board control system for a machine tool comprises in combination, a plug board having at least one column of plug sockets, some or all of the plug sockets in the or each column being grouped together to form a plug socket group or groups associated with a particular part or parts of the machine tool, the plug sockets of the or each groups when containing plugs serving to permit the particular part to operate in a particular way, control means associated with the plug sockets of the group of plug sockets respectively and which when energised cause the particular part of the machine tool to operate in a particular way, and switch means operable to scan the plug sockets of the group of plug sockets in turn, said switch means serving to complete an electric supply circuit to the control means when the associated plug socket contains a plug, said switch means being arranged to stop scanning the plug sockets when it reaches a plug socket containing a plug and to continue scanning upon receipt of a signal from the machine that an operation has been completed.

Figure 5:
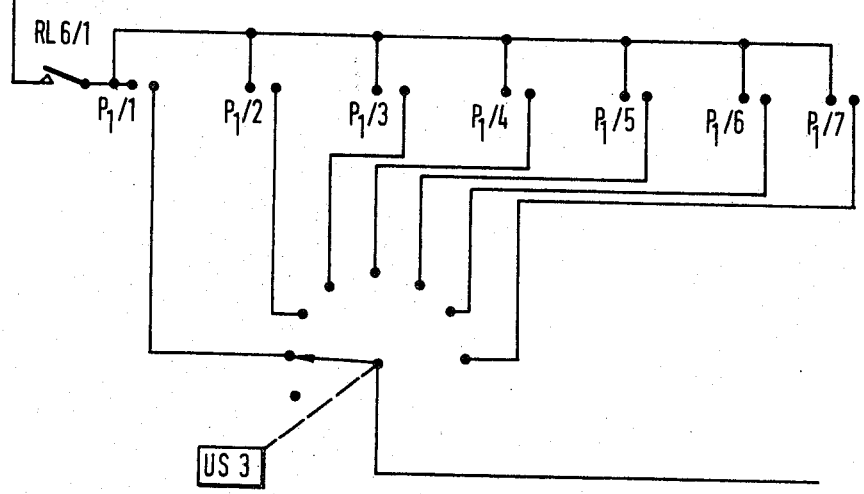
Figure 3:
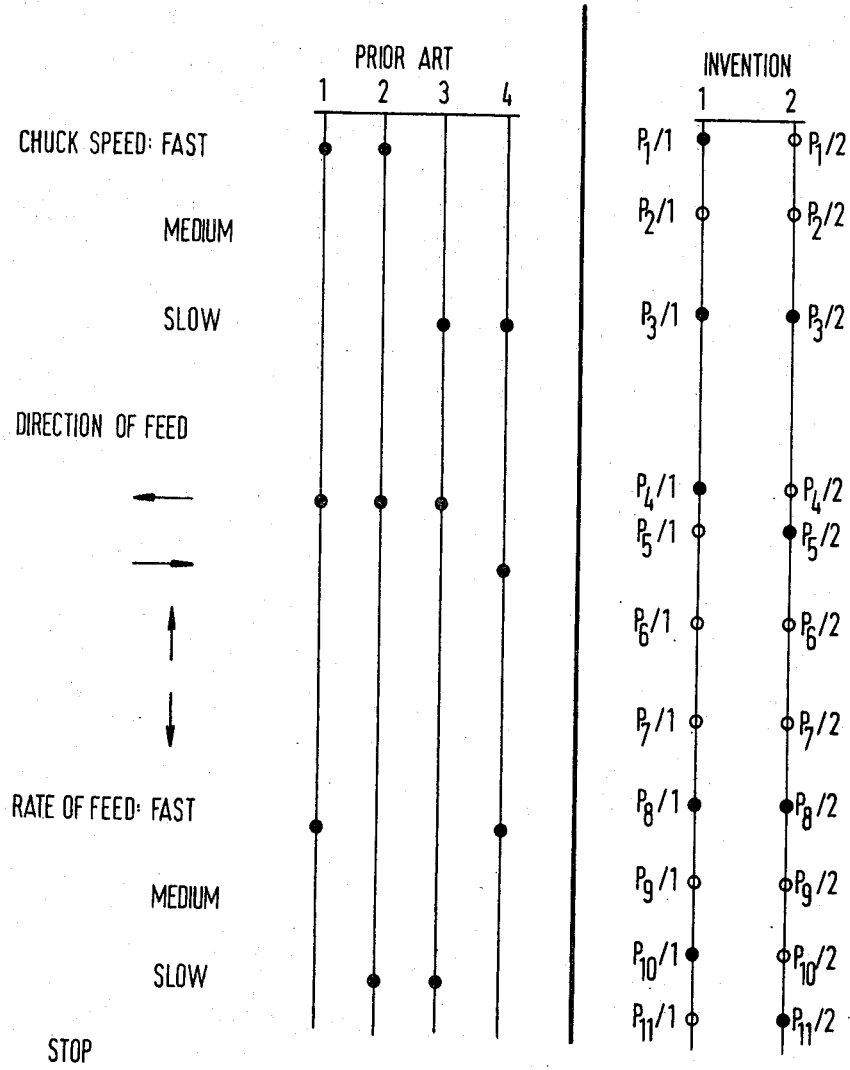
Figure 4:
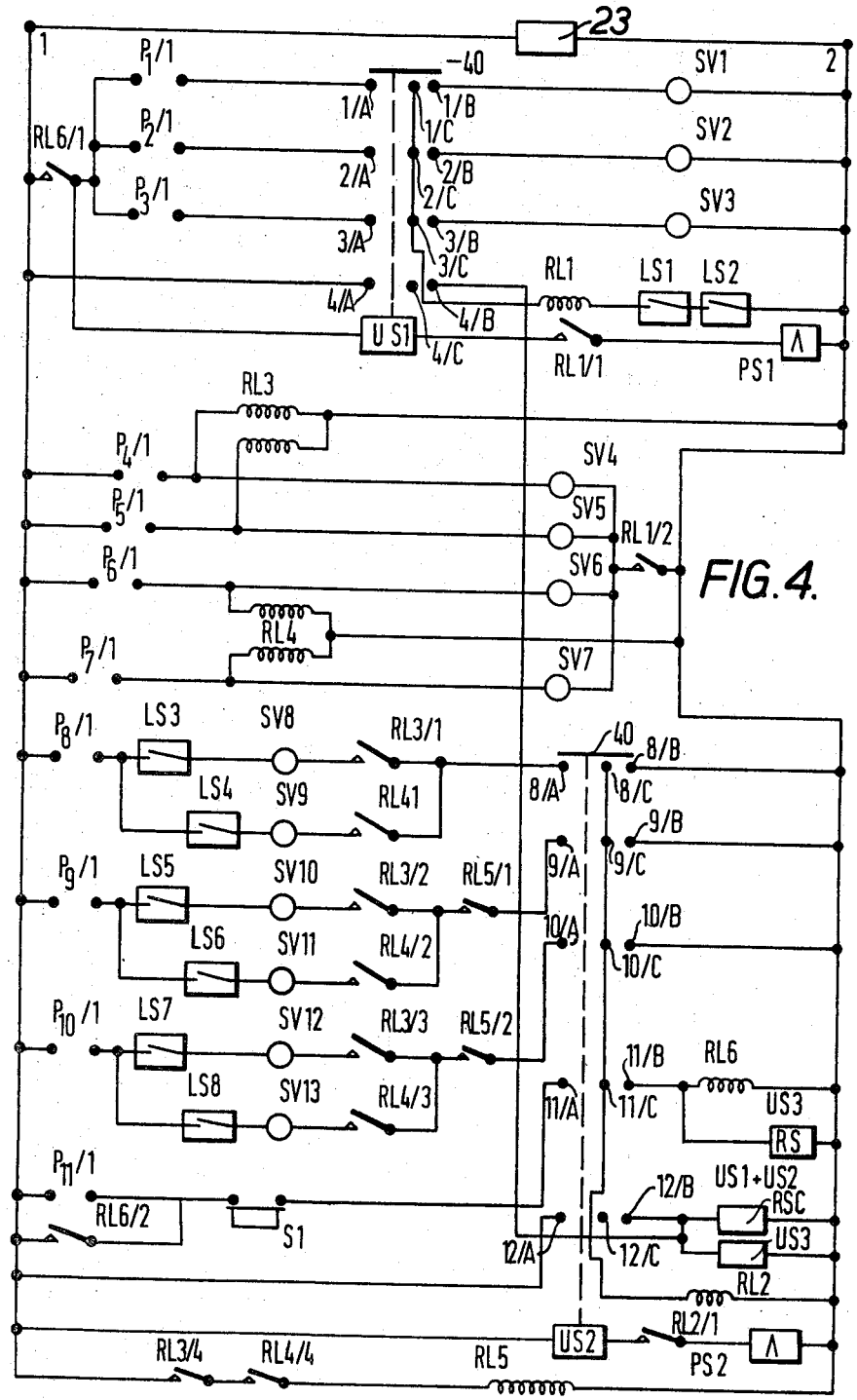

In the accompanying drawings:

FIG. 1 shows in diagrammatic form one example of a machine tool controlled by a system in accordance with the invention, FIG. 2 shows parts of the machine tool of FIG. 1, FIG. 3 shows two plug boards set up to cause the machine of FIG. 1 to machine a particular component, one of the plug boards showing the known arrangement and the other plug board showing the arrangement in accordance with the present invention, FIG. 4 is part of a circuit diagram of one example of a control system, and FIG. 5 shows the remaining portion of the circuit.

Referring to FIG. 1 of the drawings there is illustrated in diagrammatic form a simple lathe having a bed 14 which mounts a chuck 10 driven by a motor 15. The bed 14 carries a main slide 11 movable along an axis parallel to the axis of rotation of the chuck by means of a linear motor 17. Furthermore, the slide 11 carries a cross slide 12 movable relative to the slide 11 along an axis normal to the axis of rotation of the chuck. The cross slide 12 is driven relative to the slide 11 by a linear motor 16 and in use, carries a cutting tool 13 which removes metal from a workpiece 22 mounted in the chuck. Mounted on the slides 11 and 12 are stop supports 18 and 19 respectively of stops these being shown in greater detail in FIG. 2. For co-operation with the stops of the supports 18 and 19 are stacks 20 and 21 respectively of limit switches these being shown in dotted outline in FIG. 2. The stacks 20 and 21 of limit switches are mounted respectively on the bed 14 and the slide 11 of the lathe.

In each stack of limit switches there are four such switches positioned one above the other and with their operating members (not shown) disposed in the path of dogs or stops 24 adjustably and detachably mounted on the supports 18, 19. For a reason to be explained the support 19 carries no stops 24. The direction of movement of the supports 18, 19 relative to their respective banks of limit switches is indicated in FIG. 2 by an arrow and movement in this direction will be referred to as "forward" movement and during this movement the tool 13 is moving towards the workpiece 22. Movement in the opposite direction will be referred to as "reverse" movement.

Reference will now be made to FIGS. 4 and 5 which show the electrical circuit diagram of the system. As shown in FIG. 4 there are provided terminals 1 and 2 for connection to a source of electric supply 23 and in addition plug sockets $P_1/1$, $P_2/1$ . . . $P_{11}/1$ which form one column of plug sockets of the plug board. Plug sockets $P_1/1$, $P_2/1$ and $P_3/1$ form one group of plug sockets and are associated with the chuck speed control whilst $P_8/1$, $P_9/1$ and $P_{10}/1$ form another group of plug sockets and are associated with the slide 11 and the cross slide 12 feed rate control. Plug sockets $P_4/1$, $P_5/1$, $P_6/1$ and $P_7/1$ are associated with the direction of slide and cross slide movement but do not form a group in the sense used throughout this specification. Plug socket $P_{11}/1$ is a special socket although in a sense it forms part of the $P_8/1$ . . . $P_{10}/1$ group and it is concerned with stopping the whole machine at the end of the machining operation.

Plug sockets $P_1/1$, $P_2/1$ and $P_3/1$ are associated respectively with solenoid valves SV1, SV2 and SV3. These valves control the speed of the motor 15 which drives the chuck. When valve SV1 alone is energised the chuck is driven at high speed and when valves SV2 and SV3 alone are energised the chuck is driven at its medium and slow speeds respectively.

Plug sockets $P_4/1$, $P_5/1$, $P_6/1$ and $P_7/1$ are associated respectively with solenoid valves SV4, SV5, SV6 and SV7. Solenoid valve SV4 when energised, sets the motor 17 to drive the slide 11 in the forward direction although a further valve must be energised before such movement can occur. Solenoid valve SV5 when energised, sets the motor 17 to drive the slide 11 in the reverse direction but again a further valve must be energised before this movement can occur. Valves SV6 and SV7 when energised set the motor 16 to drive the cross slide 12 in the forward and reverse direction respectively but again a further valve must be energised before such movement can occur.

Plug sockets $P_8/1$, $P_9/1$ and $P_{10}/1$ each have associated therewith two solenoid valves. Considering the case of plug socket $P_8/1$ this has associated therewith solenoid valves SV8 and SV9. Solenoid valve SV8 when energised, allows the motor 17 to operate at high speed and therefore the feed rate of the slide 11 is fast. Solenoid valve SV9 when energised, allows the motor 16 to operate at high speed and therefore the feed rate of the cross slide is fast. Plug socket $P_9/1$ has solenoid valves SV10 and SV11 associated therewith and which when energised, allow a medium feed rate of the slide and cross slide whilst plug socket $P_{10}/1$ has solenoid valves SV12 and SV13 assocaited therewith and which when energised, allow a slow feed rate of the slide and cross slide respectively.

Also provided are three uniselectors US1, US2 and US3. Uniselectors US1 and US2 are associated with the groups of plug sockets $P_1/1 \ldots P_3/1$ and $P_8/1 \ldots P_{11}/1$ respectively whilst uniselector US3 is the column selector as shown in FIG. 5. As seen in FIG. 5 the system for the sake of illustration only, is provided with seven columns of plug sockets and uniselector US3 selects the columns in turn. Since there are eleven plug sockets in each column uniselector US3 will be provided with eleven banks of contacts with seven contacts in each bank to be selected. However, a dummy column of contacts is provided and to which the uniselector switches when it is reset. Uniselectors US1 and US2 considering them from the electrical aspect have bridging bars 40 which bridge contacts A, B and C as the uniselectors step. For the purpose of identification the contacts A, B and C are prefixed with the number of the plug socket with which they are associated.

Considering now the circuit in detail, one contact of each of the plug sockets $P_1/1$, $P_2/1$ and $P_3/1$ is connected to terminal 1 by way of a normally closed relay contact RL6/1, and one contact of all the remaining plug sockets is directly connected to terminal 1. The other contacts of plug sockets $P_1/1$, $P_2/1$ and $P_3/1$ are connected to contacts 1/A, 2/A and 3/A of uniselector US1 whilst contact 4/A of uniselector US1 is directly connected to terminal 1. Contacts 1/B, 2/B and 3/B of uniselector US1 are connected respectively to one terminal of the solenoid valves SV1, SV2 and SV3, the other terminals of these valves being directly connected to terminal 2. Contacts 1/C, 2/C and 3/C of uniselector US1 are connected together and to terminal 2 by way of the series circuit composed by relay coil RL1 and normally closed limit switches LS1 and LS2. One terminal of the operating coil of uniselector US1 is connected to terminal 1 by way of relay contact RL6/1 and the other terminal of the operating coil of uniselector US1 is connected to terminal 2 by way of the series circuit composed by normally closed relay contact RL1/1 and a continuously opening and closing switch PS1. Contact 4/C of uniselector US1 is not used, but terminal 4/B thereof is connected to the operating coil of uniselector US3.

The other contacts of plug sockets $P_4/1$, $P_5/1$, $P_6/1$ and $P_7/1$ are connected respectively to one terminal of the solenoid valves SV4, SV5, SV6 and SV7 whilst the other terminals of these valves are connected to terminal 2 by way of a normally open relay contact RL1/2. In addition two relays RL3 and RL4 are provided each relay having two operating coils. The aforesaid other contacts of plug sockets $P_4/1$ and $P_5/1$ are connected respectively to one end of the operating coils of relay RL3 and the other ends of these coils are connected to terminal 2. In like manner one end of the operating coils of relay RL4 are connected respectively to the aforesaid other contacts of plug sockets $P_6/1$ and $P_7/1$. The other ends of the operating coils of relay RL4 are connected to terminal 2.

The other contact of plug socket $P_8/1$ is connected to the contact 8/A of uniselector US2 by the series circuit composed of normally closed limit switch LS3, solenoid valve SV8 and normally open relay contact RL3/1 and in parallel with the series circuit is a further series circuit composed of normally open limit switch LS4, solenoid valve SV9 and normally open relay contact RL4/1. The other contact of plug socket $P_9/1$ is connected to contact 9/A of uniselector US2 by way of the series circuit composed by normally closed limit switch LS5, solenoid valve SV10 and normally open relay contact RL3/2 and in addition normally closed relay contact RL5/1, and in parallel with this series circuit with the exception of relay contact RL5/1 is the further series circuit composed of normally closed limit switch LS6, solenoid valve SV11 and normally open relay contact RL4/2. In like fashion the other contact of plug socket $P_{10}/1$ is connected to contact 10/A of uniselector US2 the series circuits in this case being normally closed limit switch LS7, solenoid valve SV12 and normally open relay contact RL3/3 and normally closed limit switch LS8, solenoid valve SV13 and normally open relay contact RL4/3, the normally closed relay contact being RL5/2.

The other contact of plug socket $P_{11}/1$ is connected to contact 11/A of uniselector US2 by way of a normally closed manually operable switch S1 and in parallel with the plug socket $P_{11}/1$ is a normally open relay contact RL6/2. Contact 11/B of uniselector US2 is connected to one terminal of a reset mechanism US3RS for uniselector US3 the other terminal of which is connected to terminal 2. Contact 12/A of uniselector US2 is directly connected to terminal 1 and contacts 8/B, 9/B and 10/B are directly connected to terminal 2. Contact 11/B of uniselector US2 is connected to terminal 2 through relay coil RL6 and contact 12/B is connected to contact 4/B of uniselector US1 and also to one terminal of a reset mechanism of uniselectors US1 and US2 the other terminal of which is connected to terminal 2.

Contacts 8/C, 9/C, 10/C and 11/C of uniselector US2 are connected together and to terminal 2 through relay coil RL2. One terminal of the operating coil of uniselector US2 is connected to terminal 1 whilst the other terminal of the operating coil is connected to terminal 2 through the series circuit composed of normally closed relay contact RL2/1 and a further continuously opening and closing switch PS2. Finally connected between terminals 1 and 2 is a series circuit composed by normally open relay contacts RL3/4 and RL4/4 and relay coil RL5.

In order to assist in explaining the operation of the system consider a highly simplified machining operation in which the tool 13 is moved towards the workpiece 22 by forward movement of the slide 11, at a fast rate with the chuck 10 rotating at a fast speed and is then moved more slowly so that the tool acts upon the workpiece. At a later stage in the cycle the chuck speed is reduced and when machining is complete the tool is withdrawn by reverse movement of the slide at a fast rate, finally the machine is stopped. It will be noted that there is no movement of the cross slide in the above operation however, its mode of operation will be obvious as the explanation proceeds.

The plug board is set up as is shown in FIG. 3 and the stops 24 on the support 18 as in FIG. 2. The starting point for the sequence is at the end of a previous machining sequence and at this point the bridging bar 40 of uniselector US2 is bridging contacts 11/A, 11/B and 11/C so that relay coil RL6 is energised. Relay contact RL6/1 is held open so that solenoid valves SV1, SV2 and SV3 are not energised and therefore the chuck is not rotating. Furthermore, because of the position of the bridging bar 40 of uniselector US2 none of the solenoid valves SV8, SV9 . . . SV13 are energised so that there is no movement of the slides. Moreover, relay RL2 is energised so that contact RL2/1 is open and no current can therefore flow in the actuating coil of uniselector US2. Uniselector US3 has been reset so that the plug sockets of the dummy column are connected.

When the switch S1 is opened by the operator relay RL6 is de-energised and relay contact RL6/1 closes thereby allowing the solenoid valves SV1, SV2 and SV3 to be energised depending on uniselector US1. Also when switch S1 is open relay RL2 is de-energised and relay coil RL2/1 closes so that uniselector US2 steps on to bridge contacts 12/A, 12/B and 12/C. In this position uniselector US1 and US2 are reset and uniselector US3 is provided with a signal which causes it to select the plug sockets of column one. Referring to FIG. 3 it will be seen that in column 1 plug sockets $P_1/1$, $P_3/1$, $P_4/1$, $P_8/1$ and $P_{10}/1$ are provided with plugs. Accordingly with the bridging bar 40 of uniselector US1 bridging contacts 1/A, 1/B and 1/C relay RL1 and solenoid valve SV1 are energised the latter causing the chuck to be driven at its maximum speed. With relay RL1 energised relay contact RL1/1 is opened so that no pulses of current pass through the operating coil of uniselector US1. Therefore the uniselector remains in this position. A plug is present in plug socket $P_4/1$ so that with relay contact RL1/2 held closed solenoid valve $SV_4$ is energised and the forward movement of slide 11 is selected. In addition relay RL3 is energised and relay contacts RL3/1, RL3/2, RL3/3 and RL3/4 are closed. Relay RL4 is not energised so that relay RL5 also is not energised and relay contacts RL5/1 and RL5/2 are closed.

A plug is present in socket $P_8/1$ so that with contacts 8/A, 8/B and 8/C shorted by bridging bar 40 of uniselector US2, uniselector US2 will stay in this position and solenoid valve SV8 will be energised thereby energising motor 17 so that slide 11 moves in the forward direction at its maximum rate as required. At a predetermined position of the slide limit switch LS3 is opened by the stop 24a and solenoid valve SV8 is de-energised together with relay RL2. Relay contact RL2/1 is therefore allowed to close and current pulses pass through the operating coil of uniselector US2 until its bridging bar bridges contact 10/A, 10/B and 10/C where by virtue of the plug in socket $P_{10}/1$ relay RL2 is again energised and the current pulses cease to flow. Solenoid valve SV12 is therefore energised and the slide 11 moves in the forward direction at its slowest rate again as required by the programme. Machining of the workpiece continues until limit switch LS1 is opened by stop 24b and the effect of this is to allow the operating coil of uniselector US1 to receive current pulses until its bridging bar bridges contacts 3/A, 3/B and 3/C and with a plug in socket $P_3/1$ solenoid valve SV3 is energised so that the chuck speed is reduced to its minimum. It should be noted that limit switches LS1 and LS2 are of a type which momentarily open the circuit only so that they can complete the circuit for relay coil RL1 as the uniselector US1 steps. If necessary the characteristics of relay RL1 may be modified to achieve the same object.

Machining of the workpiece continues until stop 24c opens limit switch LS7 with the result that relay RL2 is de-energised and the operating coil of uniselector US2 receives current pulses. Solenoid valve SV12 is also de-energised so that forward feed of slide 11 ceases. The bridging bar 40 of uniselector US2 passes contacts 11/A, 11/B and 11/C since there is no plug in plug socket $P_{11}/1$ and bridges contacts 12/A and 12/B causing uniselector US3 to select the second column and causing itself and uniselector US1 to be reset.

In column 2 plugs are present in sockets $P_3/2$, $P_5/2$, $P_8/2$ and $P_{11}/2$ so that the slow chuck speed is maintained but the direction of slide movement is reversed and its rate of movement increased to its highest rate. Such movement continues until stop 24d opens limit switch LS3 and solenoid valve SV8 is de-energised thereby stopping the slide. In addition in the manner described above the operating coil of uniselector US2 receives pulses of current until its bridging bar 40 bridges contacts 11/A, 11/B and 11/C. At this point uniselector US3 is reset to the dummy position however, the stop signal is held by energisation of relay RL6 and its holding contact RL6/2. Relay contact RL6/1 is open and therefore solenoid valve SV3 is opened so that the chuck stops rotating.

It will be noted that owing to the provision of relay contact RL1/2 the slides cannot move if the chuck is not rotating. Furthermore, if both the slide 11 and cross slide 12 are selected for movement together then by virtue of relay contacts RL5/1 and RL5/2 they can only be moved at the fast rate. This is to ensure that where individual drive motors are provided as in the present case, simultaneous feed cannot be used to produce a taper the accuracy of which could not be guaranteed.

If movement of the cross slide is required the appropriate sockets are filled with plugs and the appropriate stops set it being understood that movement of both the slide and cross slide can be utilised in the machining sequence. Moreover, although a system providing for only three chuck speeds and three feed rates has been described it will be understood that any number of speeds and feed rates can be provided.

The system has been described as applied to a simple lathe, more complex systems however can be designed for lathes having two independent slides and cross slides and also employing turret mounted tools and where it is required to change the tools during the machining operation. Furthermore, although uniselectors and electromagnetic relays form the basis of the system described it will be understood that ring counters employing solid state devices can be utilised.

By way of example part of FIG. 3 shows the prior art arrangement in which in order to achieve the same number of speed, feed rate and feed direction changes four columns of the plug board are required a new column being scanned whenever a change or changes is/are required.

Having thus described my invention what I claim as new and desire to secure by Letters Patent is:

1. A machine tool and a plug board control system therefore the machine tool comprising a first powered member, and second and third powered members, first motor means for driving the first powered member, and second and third reversible motor means for driving the second and third respectively, the control system comprising a plug board having a plurality of columns each column having a plurality of plug sockets, each column having two groups of plug sockets the two groups of plug sockets being in corresponding positions in all the columns, a plurality of control means associated with one of said groups of plug sockets respectively each of which when energised cause operation of the first motor means at a particular speed, first switch means for scanning the plug sockets of said one group in turn and arranged upon locating a plug in one of the plug sockets to complete an electric circuit to the associated control means, a plurality of control means associated with the other group of plug sockets respectively each of which when energised determines the speed of rotation of the second and third motor means, second switch means for scanning the plug sockets of said other group in turn and arranged upon locating a plug in one of the plug sockets to complete an electric circuit to the associated control means, further sockets in each column, further control means associated with said further sockets respectively said further control means when energised serving to determine the direction of movement of the second and third reversible motor means respectively, said pair of switch means being arranged to stop scanning their groups of plug sockets in response to signal means upon reaching a plug socket containing a plug, and to continue scanning in response to second signal means on the machine that an operation has been completed.

2. A machine tool and a plug board control system as claimed in claim 1 including third switch means operable to cause the next column of plug sockets to be scanned when the first and second switch means have finished scanning their groups of plug sockets.

3. A machine tool and a plug board control system as claimed in claim 2 including first and second micro switches operable to cause the first switch means to continue scanning when a change of speed of said first powered member is required, said first and second micro switches being operated when the second and third powered members have attained predetermined positions respectively.

4. A machine tool and a plug board control system as claimed in claim 3 including means operable to only allow operation of the second and third motor means at their maximum speeds when movement of both second and third powered members is selected by insertion of two plugs in said further plug sockets.

5. A machine tool and a plug board control system as claimed in claim 4 including means for selecting the control means for the speed of the second and third motor means depending upon the plug socket of said further group of plug sockets which has a plug.

6. A machine tool and a plug board control system as claimed in claim 5 including limit switches in circuit with each of the control means of said other group respectively said limit switches being operable to cause the second switch means to continue scanning when a change in feed rate of the second or third powered members is required, said limit switches being operated when the second and third powered member have attained predetermined positions respectively.

References Cited

UNITED STATES PATENTS 2,838,963  6/1958  Good et al. _____ 82—21.2X

FOREIGN PATENTS 739,804  11/1955  Great Britain.

LEONIDAS VLACHOS, Primary Examiner

U.S. Cl. X.R.

318—162